(12) United States Patent
Yang et al.

(10) Patent No.: US 11,267,555 B2
(45) Date of Patent: Mar. 8, 2022

(54) METHODS AND UNMANNED AERIAL VEHICLES FOR LONGER DURATION FLIGHTS

(71) Applicant: GEOSAT Aerospace & Technology, Tainan (TW)

(72) Inventors: Fu-Kai Yang, Tainan (TW); Chien-Hsun Liao, Taichung (TW); Yi-Feng Cheng, Tainan (TW); Di-Yang Wang, Taipei (TW); Meng-Yan Shen, Taichung (TW)

(73) Assignee: GEOSAT AEROSPACE & TECHNOLOGY, Tainan (TW)

( * ) Notice: Subject to any disclaimer, the term of this patent is extended or adjusted under 35 U.S.C. 154(b) by 455 days.

(21) Appl. No.: 16/241,987

(22) Filed: Jan. 7, 2019

(65) Prior Publication Data
US 2019/0210713 A1    Jul. 11, 2019

Related U.S. Application Data

(60) Provisional application No. 62/614,976, filed on Jan. 8, 2018.

(51) Int. Cl.
| | |
|---|---|
| *B64C 17/02* | (2006.01) |
| *B64C 39/02* | (2006.01) |
| *G01M 1/12* | (2006.01) |
| *G06G 7/70* | (2006.01) |
| *B64C 39/10* | (2006.01) |

(52) U.S. Cl.
CPC ............ *B64C 17/02* (2013.01); *B64C 39/024* (2013.01); *G01M 1/127* (2013.01); *G06G 7/70* (2013.01); *B64C 2039/105* (2013.01); *B64C 2201/042* (2013.01); *B64C 2201/165* (2013.01)

(58) Field of Classification Search
CPC .............. B64C 17/02; B64C 2039/105; B64C 2201/042; B64C 2201/104; B64C 2201/165; B64C 39/024; G01M 1/127; G06G 7/70
See application file for complete search history.

(56) References Cited

U.S. PATENT DOCUMENTS

| | | | | |
|---|---|---|---|---|
| 3,513,300 | A * | 5/1970 | Elfenbein | G01M 1/125 701/124 |
| 4,060,930 | A * | 12/1977 | Hirtle | A63H 27/14 446/65 |
| 5,214,586 | A * | 5/1993 | Nance | G01G 19/07 701/124 |
| 5,695,153 | A * | 12/1997 | Britton | B64F 1/04 124/63 |

(Continued)

*Primary Examiner* — Medhat Badawi
(74) *Attorney, Agent, or Firm* — Finnegan, Henderson, Farabow, Garrett & Dunner LLP

(57) ABSTRACT

The present application provides an unmanned aerial vehicle (UAV) for a long duration flight. An exemplary UAV may include a UAV body assembly. The UAV may also include a flight control system (FCS) coupled to the UAV body assembly. The UAV may further include a motor coupled to the UAV body assembly at one end and coupled to a propeller at the other end. The FCS is communicatively connected to the motor. A center of gravity (CG) of the UAV is at a point between 21% and 25% of a mean aerodynamic chord (MAC) of the UAV.

15 Claims, 15 Drawing Sheets
(3 of 15 Drawing Sheet(s) Filed in Color)

(56) References Cited

U.S. PATENT DOCUMENTS

| | | | | |
|---|---|---|---|---|
| 5,980,429 A * | 11/1999 | Nashner | A61B 5/1036 | 434/247 |
| 6,176,367 B1 * | 1/2001 | Patrito | B62D 65/18 | 198/465.3 |
| 6,457,673 B1 * | 10/2002 | Miller | B64F 1/06 | 244/63 |
| 6,851,647 B1 * | 2/2005 | Rosenbaum | B64F 1/06 | 244/63 |
| 7,210,654 B1 * | 5/2007 | Cox | B64F 1/06 | 244/63 |
| 7,318,565 B2 * | 1/2008 | Page | B64C 39/024 | 244/54 |
| 8,511,607 B2 * | 8/2013 | Robinson | B64F 1/06 | 244/63 |
| 8,584,985 B2 * | 11/2013 | Woolley | F41B 3/02 | 244/63 |
| 9,969,504 B1 * | 5/2018 | Davis | B64F 1/06 | |
| 10,118,713 B2 * | 11/2018 | Tully | B64F 1/08 | |
| 10,370,120 B1 * | 8/2019 | McGann | B64F 1/06 | |
| 10,377,481 B2 * | 8/2019 | Childress | B64F 1/04 | |
| 10,831,192 B1 * | 11/2020 | Piasecki | G05D 1/0088 | |
| 10,940,953 B1 * | 3/2021 | Piasecki | B64C 39/024 | |
| 2009/0114773 A1 * | 5/2009 | Helou, Jr. | B64C 39/02 | 244/137.1 |
| 2011/0315806 A1 * | 12/2011 | Piasecki | B64D 17/80 | 244/2 |
| 2012/0205488 A1 * | 8/2012 | Powell | B64C 39/024 | 244/63 |
| 2014/0249700 A1 * | 9/2014 | Elias | G01G 19/07 | 701/14 |
| 2016/0070261 A1 * | 3/2016 | Heilman | B64C 39/024 | 701/2 |
| 2017/0057635 A1 * | 3/2017 | Strayer | B64C 39/024 | |
| 2017/0173451 A1 * | 6/2017 | Pedersen | A63F 13/792 | |
| 2017/0300054 A1 * | 10/2017 | Hanson | B63B 1/32 | |
| 2018/0067498 A1 * | 3/2018 | Wang | G05D 1/0669 | |
| 2018/0229833 A1 * | 8/2018 | Kimchi | B64D 31/06 | |
| 2018/0290725 A1 * | 10/2018 | Koessler | B64C 17/02 | |
| 2018/0350258 A1 * | 12/2018 | He | G01S 19/26 | |
| 2018/0362190 A1 * | 12/2018 | Chambers | B64D 45/00 | |
| 2019/0031361 A1 * | 1/2019 | McCullough | G05D 1/0077 | |
| 2019/0047726 A1 * | 2/2019 | Carthew | B64C 39/024 | |
| 2019/0144108 A1 * | 5/2019 | McCullough | B64C 39/024 | 244/23 B |
| 2019/0220038 A1 * | 7/2019 | Shih | G05D 1/0661 | |
| 2019/0291857 A1 * | 9/2019 | Arsentyev | B64C 39/024 | |
| 2019/0291860 A1 * | 9/2019 | Morgan | B64D 35/04 | |
| 2019/0371341 A1 * | 12/2019 | Schwindt | G06F 21/32 | |
| 2020/0333779 A1 * | 10/2020 | Regev | B64C 39/024 | |

\* cited by examiner

METHODS AND UNMANNED AERIAL VEHICLES FOR LONGER DURATION FLIGHTS

CROSS REFERENCE TO RELATED APPLICATION

The present application claims the benefit of priority to U.S. Provisional Application No. 62/614,976, filed on Jan. 8, 2018, the entire content of which is incorporated herein by reference.

TECHNICAL FIELD

The present application relates to unmanned aerial vehicles (UAVs), and more particularly, to methods and UAVs for longer duration flights.

BACKGROUND

UAVs are used in various applications, such as taking aerial images, building geographic models, survey and monitoring. For these applications, UAVs may need to fly for a long time or over a long distance. To allow UAVs to do, one approach is to use a higher capacity battery. However, the UAV may not be able to carry a battery of a large capacity. It would be desirable to have methods and UAVs for longer duration flights.

SUMMARY

Embodiments of the present disclosure provide improved methods and UAVs capable of longer duration flights. In at least one embodiment, the UAV includes a UAV body assembly. Exemplary UAVs also include a flight control system (FCS) coupled to the UAV body assembly. The UAV may further include a motor coupled to the UAV body assembly at one end and coupled to a propeller at the other end. The FCS is communicatively connected to the motor. In exemplary embodiments, the center of gravity (CG) of the UAV is at a point between 21% and 25% of a mean aerodynamic chord (MAC) of the UAV. For example, the CG is at 23.5% or 24% of the MAC of the UAV for longer flight duration. The integrated FCS may include a flight control computer (FCC), an attitude and heading reference system (AHRS) communicatively connected to the FCC, a communication module communicatively connected to the FCC; and an antenna communicatively connected to the communication module, wherein the antenna is embedded in the UAV body assembly.

In embodiments consistent with the present disclosure, the UAV may also include an adjustment assembly configured to adjust the CG at the point between 23% and 25% of the MAC of the UAV. The UAV may further include a pitot tube coupled to the UAV body assembly, and a hook coupled to the UAV body assembly beneath the integrated FCS. The hook is for use of launching from a launch rack. The pitot tube may be integrated together with the hook to reduce a wind resistance of the UAV. The antenna, the pitot tube and the hook may be aligned with a central axis of the UAV body assembly. The integrated pitot tube and hook may cause a wind resistance substantially equal to a wind resistance of the pitot tube or a wind resistance of the hook. The antenna may be embedded in the hook. The antenna may be a flat antenna. The hook may be made of glass fiber.

Also disclosed herein are methods for adjusting a CG of a UAV to achieve long duration flights. Exemplary methods may include adjusting a position of at least one of a payload, a battery, or a flight control system of the UAV to change the CG within a predetermined range of a MAC of the UAV. In certain embodiments, the predetermined range of the MAC of the UAV may be between 21% and 25% or between 23% and 25%. The predetermined range of the MAC of the UAV may include a point at 23.5% or 24% of the MAC of the UAV.

It is to be understood that the foregoing general description and the following detailed description are exemplary and explanatory only, and are not restrictive of the inventions, as claimed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Reference will now be made to the accompanying drawings showing exemplary embodiments of this disclosure. In the drawings.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
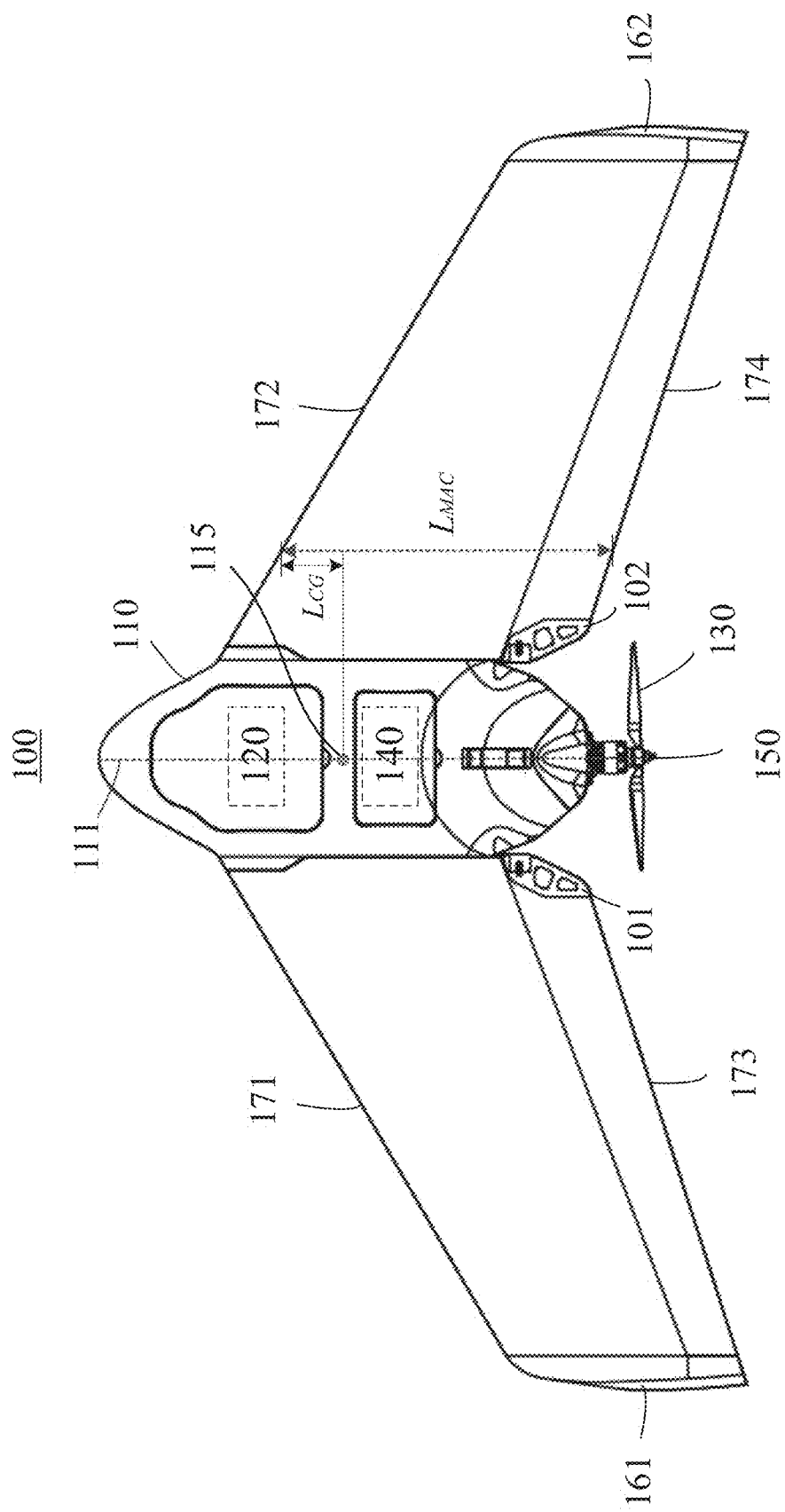
FIG. 1 illustrates a top view of an exemplary UAV for a longer duration flight, according to some embodiments of the present disclosure.

FIG. 1 illustrates a top view of an exemplary UAV 100 for a longer duration flight, according to some embodiments of the present disclosure. UAV 100 includes a UAV body assembly 110, a flight control system (FCS) 120, a payload 140, a left wing 171 and a right wing 172, a left aileron 173 and a right aileron 174, a left winglet 161 and a right winglet 162, a left aileron controller 101 and a right aileron controller 102, a motor 150, and a propeller 130. Payload 140 may be, for example, a camera or a multispectral camera. FCS 120 is coupled to UAV body assembly 110. Motor 150 is coupled to UAV body assembly 110 at one end and coupled to propeller 130 at the other end. The FCS is communicatively connected to motor 150. FCS 120 may be configured to control left aileron 173 and right aileron 174 by servo motors connected to left aileron controller 101 and right aileron controller 102, respectively.

As shown in FIG. 1, a center of gravity (CG) 115 of UAV 100 may be arranged at a point between 21% and 25% of a mean aerodynamic chord (MAC) $L_{MAC}$ of the UAV 100, i.e., $0.21 \leq$ $$0.21 \leq \frac{L_{CG}}{L_{MAC}} \leq 0.25,$$

≤0.25, where $L_{CG}$ is a length from the CG to one end of the MAC at the leading edge of an aerofoil, and $L_{MAC}$ is a length of the MAC. In one example, a UAV 100 having a wingspan of 1.4 meters and a takeoff weight 2.2 kilograms may fly forty to seventy minutes with the CG at the point between 21% and 25% of the MAC.

In some embodiments, UAV 100 may include a CG at a point between 23% and 25% of the MAC of UAV 100. For example, a UAV 100 having the wingspan of 1.4 meters and the takeoff weight 2.2 kilograms may fly at least sixty minutes with a CG at a point between 23% and 25% of the MAC.

In some embodiments, UAV 100 may include a CG at 23.5% of the MAC of UAV 100. For example, a UAV 100 having a wingspan of 1.4 meters and the takeoff weight 2.2 kilograms may fly seventy minutes or more with the CG at the point at 23.5% of the MAC. Alternatively, UAV 100 may include the CG is at 24% of the MAC of UAV 100 for a long flight time. In this example, a UAV 100 having a wingspan of 1.4 meters and the takeoff weight 2.2 kilograms may fly seventy minutes or more with the CG at the point at 24% of the MAC.

Figure 2:
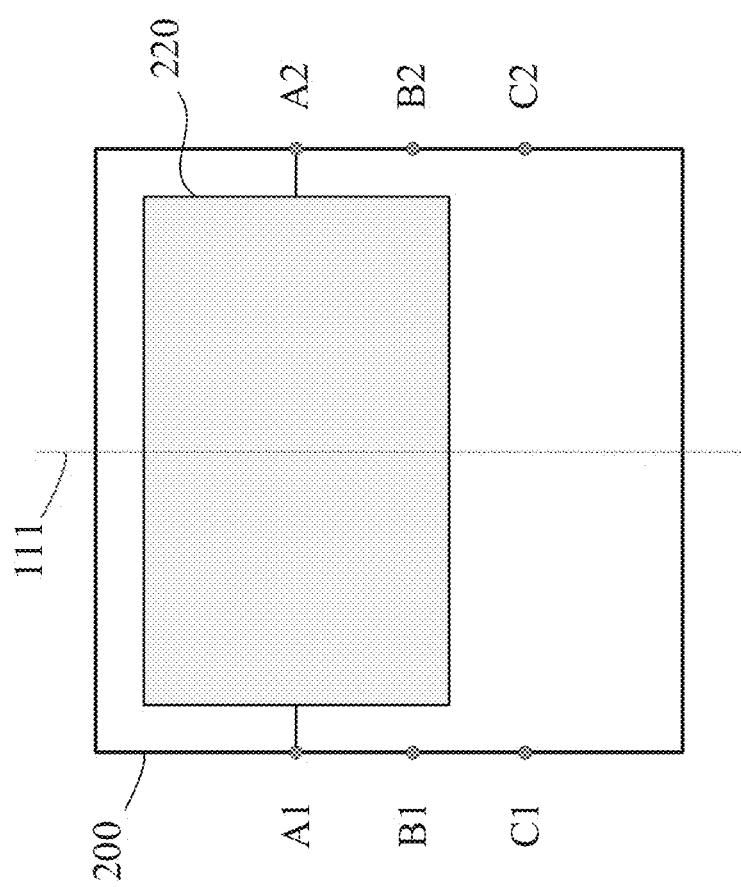
FIG. 2 is a schematic diagram of an exemplary adjustment assembly of a UAV for a longer duration flight, according to some embodiments of the present disclosure.

FIG. 2 is a schematic diagram of an exemplary adjustment assembly 200 of UAV 100 for longer duration flights, according to some embodiments of the present disclosure. Adjustment assembly 200 is a frame that includes three positions at its two sides for fixing FCS 120, payload 140, and/or a battery of UAV 100 in order to adjust the CG of UAV 100 at a point between 21% and 25% of the MAC of UAV 100. The three positions of adjustment assembly 200 include: fix points A1 and A2, fix points B1 and B2, and fix points C1 and C2, where a position by the fix points A1 and A2 is closer to a head of UAV body assembly 110 than a position by the fix points C1 and C2.

For example, when UAV 100 requires adjusting its CG towards 21% of the MAC, FCS 120 may be fixed at the fix positions A1 and A2. In contrast, when UAV 100 requires adjusting its CG towards 25% of the MAC, FCS 120 may be fixed at the fix positions C1 and C2. Likewise, payload 140 and/or the battery of UAV 100 can also be fixed at selectable fix points of their frames to adjust the CG of UAV 100. In some embodiments, UAV 100 may include one or more frames similar to frame 200 for FCS 120, payload 140, and/or the battery, respectively, to adjust the CG at the point between 21% and 25% of the MAC of UAV 100 for a flight duration longer than forty minutes. Alternatively, UAV 100 may include one or more frames 200 for FCS 120, payload 140, and/or the battery, respectively to adjust the CG at the point between 23% and 25% of the MAC of UAV 100 for a flight duration longer than sixty minutes. In some embodiments, UAV 100 may include one or more frames 200 for FCS 120, payload 140, and/or the battery, respectively to adjust the CG at 23.5% or 24% of the MAC of UAV 100 for a flight duration of seventy minutes or more.

Figure 3:
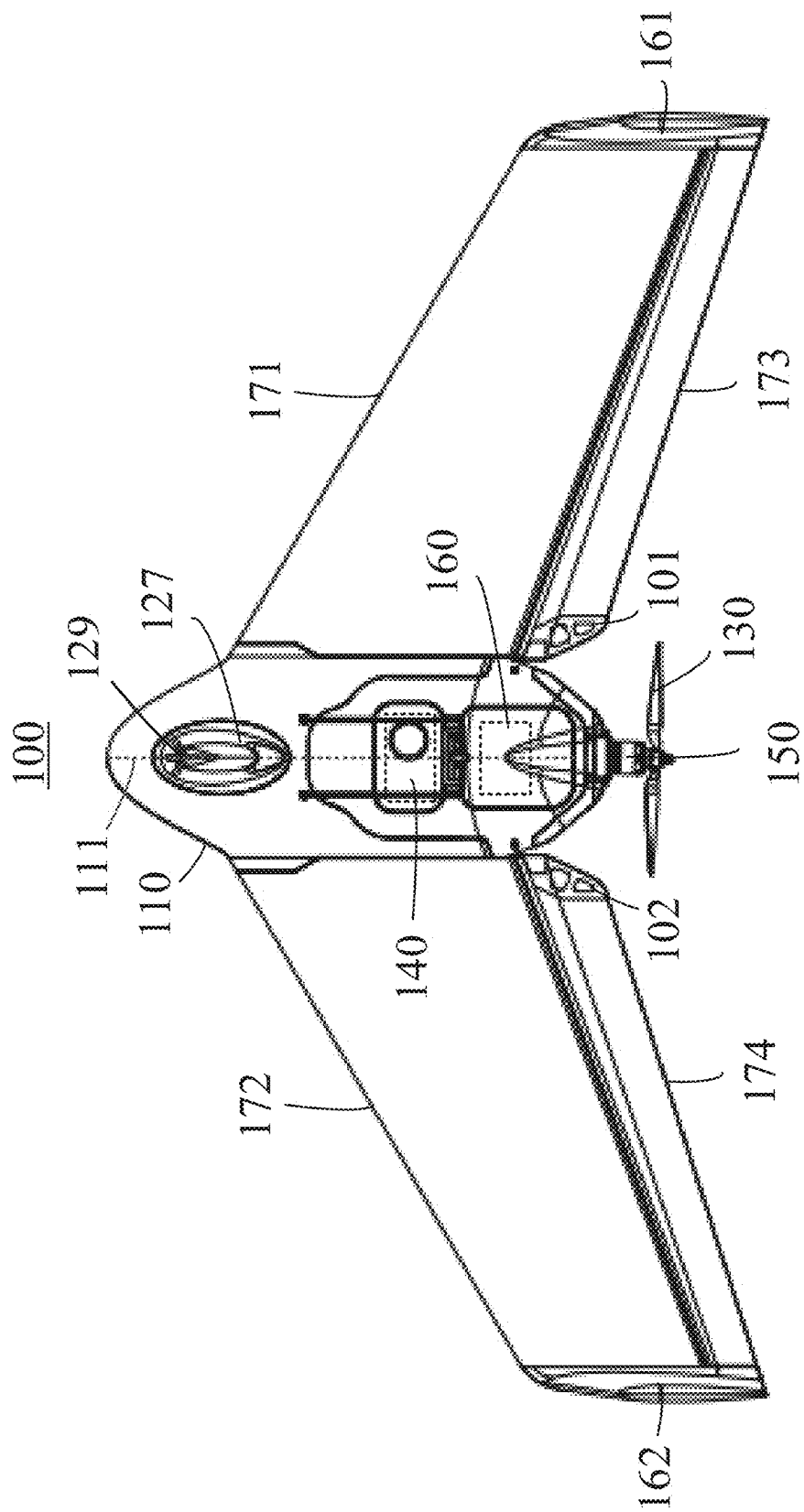
FIG. 3 illustrates a bottom view of an exemplary UAV for a longer duration flight, according to some embodiments of the present disclosure.

FIG. 3 illustrates a bottom view of an exemplary UAV for longer flight duration, according to some embodiments of the present disclosure. UAV 100 includes UAV body assembly 110, left wing 171 and right wing 172, left aileron 173 and right aileron 174, left winglet 161 and right winglet 162, left aileron controller 101 and right aileron controller 102, motor 150, propeller 130, a hook 127, a pitot tube 129, payload 140, and a parachute 160. Pitot tube 129 is coupled to UAV body assembly 110. Hook 127 is coupled to UAV body assembly 110 beneath FCS 120. Hook 127 is for use of launching UAV 100 from a launch rack. Pitot tube 120 may be integrated together with hook 127, which may reduce wind resistance. For example, as shown in FIGS. 3 and 4, pitot tube 129 and hook 127 are integrated together and are of streamlined shapes, thereby protecting pitot tube 129 and reducing unnecessary wind resistance.

In some embodiments, the FCS may include a flight control computer (FCC), an attitude and heading reference system (AHRS) communicatively connected to the FCC, a communication module communicatively connected to the FCC, an antenna 125 communicatively connected to the communication module. Antenna 125 may be embedded in UAV body assembly 100 to reduce unnecessary wind resistance of UAV 100.

In some embodiments, the FCC, antenna 125, pitot tube 129 and hook 127 are aligned with a central axis 111 of UAV body assembly 110. For example, as shown in FIG. 3, integrated pitot tube 129 and hook 127 are arranged on central line 111 of body 110 while payload 140, parachute 160, motor 150, and propeller 130 are also arranged on central line 111. Positioning payload 140, parachute 160, motor 150, and propeller 130 behind integrated pitot tube 129 and hook 127 may help to balance UAV 100 and/or reduce wind resistance caused by these components.

Figure 4:
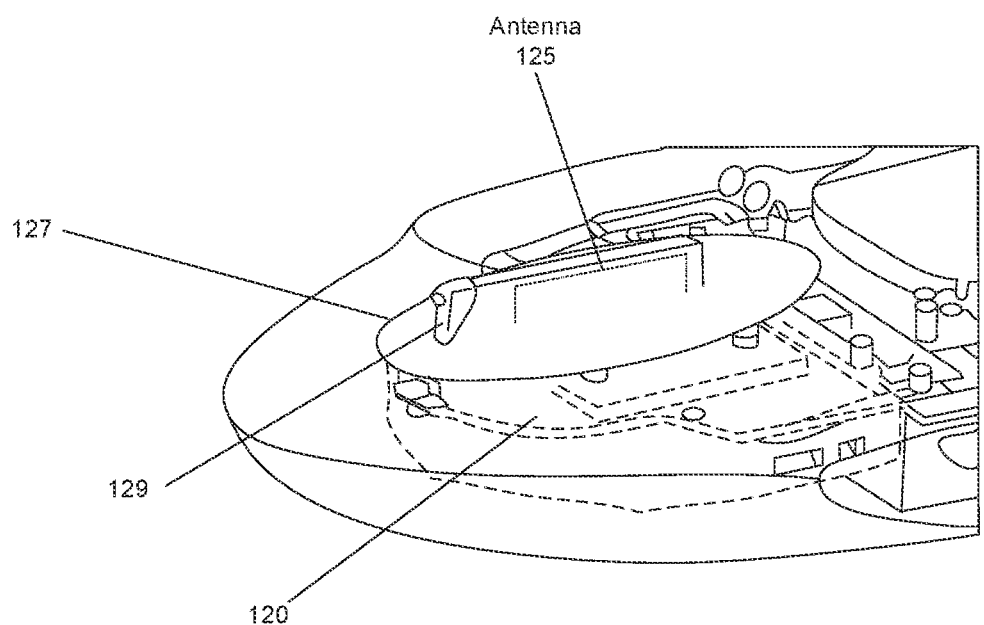
FIG. 4 illustrates an exemplary integrated pitot tube and hook of an exemplary UAV for a longer duration flight, according to some embodiments of the present disclosure.

FIG. 4 illustrates exemplary integrated pitot tube 129 and hook 127 of exemplary UAV 100, according to some embodiments of the present disclosure. As shown in FIG. 4, pitot tube 129 may be integrated or embedded in the front of hook 127. In some embodiments, antenna 125 may be embedded in hook 127, as illustrated in FIG. 4, to reduce wind resistance that antenna 125 may cause if antenna 120 is not embedded in UAV assembly body 110 or hook 127. Antenna 125 may be implemented to be a flat antenna that can facilitate installation of antenna 125 in hook 127. In some embodiments, hook 127 is made of glass fiber that provides solid structure for launching from a launch rack. Use of glass fiber has the benefit of not blocking signal transmissions from antenna 125, and is lightweight.

In some embodiments, integrated pitot tube 129 and hook 127 may cause wind resistance substantially equal to the wind resistance of pitot tube 129 alone. For example, when pitot tube 129 contains a windward side that can cover a windward side of hook 127, integrated pitot tube 129 and hook 127 may cause wind resistance substantially equal to the wind resistance of pitot tube 129 alone.

In some embodiments, integrated pitot tube 129 and hook 127 may cause wind resistance substantially equal to a wind resistance of hook 127. For example, when pitot tube 129 contains a windward side that may not cover a windward side of hook 127, integrated pitot tube 129 and hook 127 may cause the wind resistance substantially equal to the wind resistance of hook 127 that is integrated behind pitot tube 129.

Figure 5A:
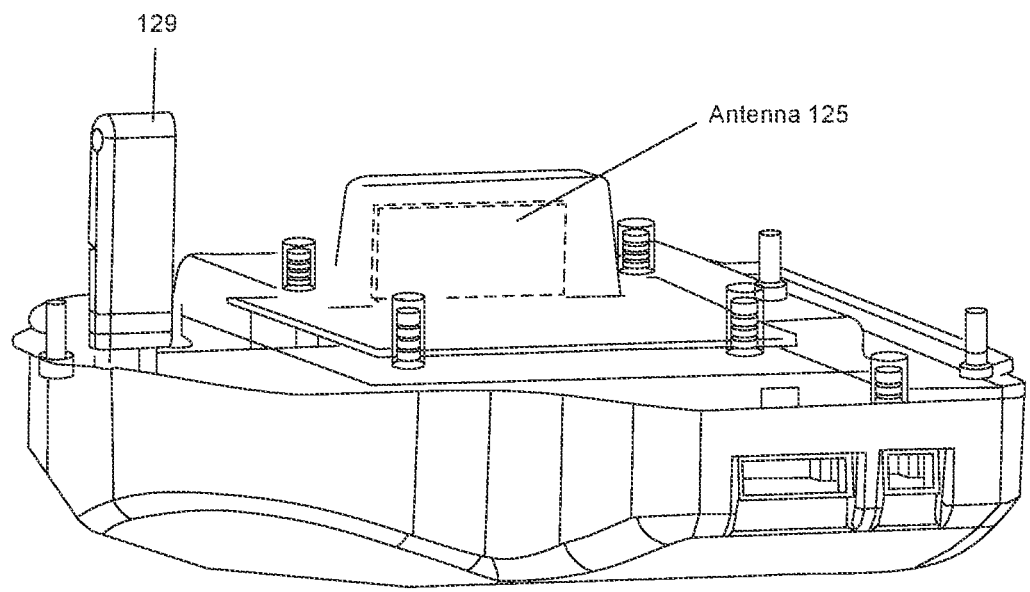
FIG. 5A illustrates an exemplary antenna embedded in a body assembly of an exemplary UAV for a longer duration flight, according to some embodiments of the present disclosure.

FIG. 5A illustrates exemplary antenna 125 embedded in UAV body assembly 110 of exemplary UAV 100, according to some embodiments of the present disclosure. Antenna 125 is embedded in UAV body assembly 110. Specifically, antenna 125 is embedded in UAV body assembly 110 and extended to hook 127. As discussed above, hook 127 may be made of glass fiber to reduce interference. In addition, pitot tube 129 is aligned with antenna 125 along with central line 111, thereby reducing wind resistance.

Figure 5B:
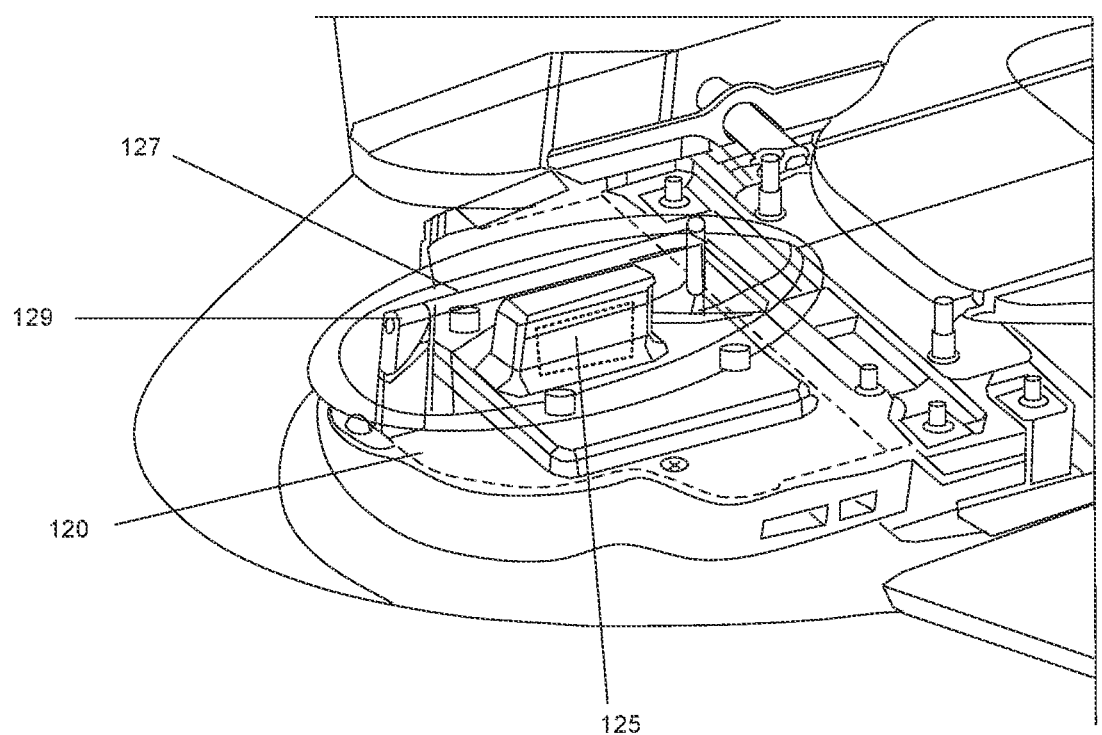
FIG. 5B illustrates an exemplary antenna embedded in a hook of an exemplary UAV for a longer duration flight, according to some embodiments of the present disclosure.

FIG. 5B illustrates exemplary antenna 125 embedded in hook 127 of exemplary UAV 100, according to some embodiments of the present disclosure. Further to FIG. 5A, FIG. 5B illustrates how hook 127, pitot tube 129, and antenna 125 may be integrated. As noted above in descriptions for FIGS. 3, 4, and 5A, integrated pitot tube 129 and hook 127 may reduce unnecessary wind resistance.

Figure 5C:
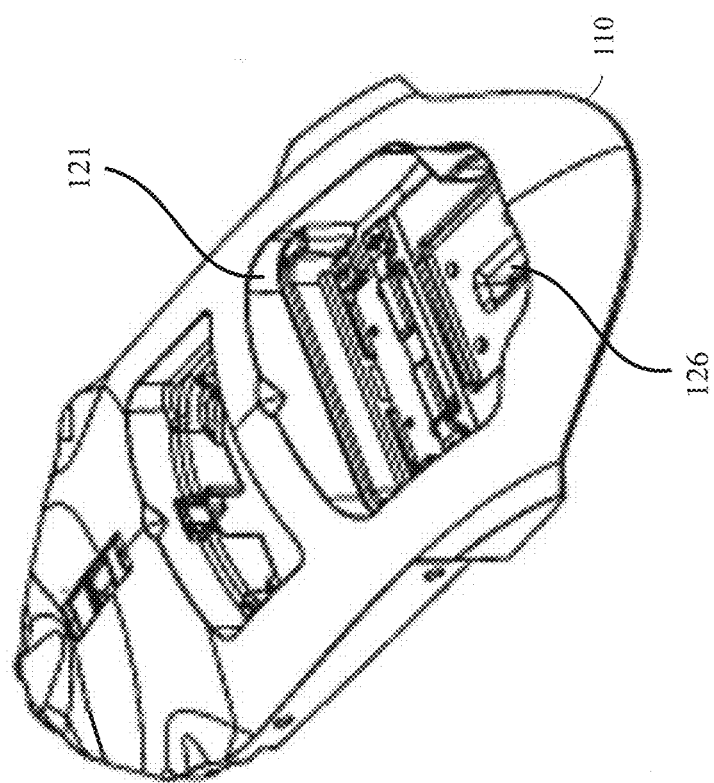
FIG. 5C illustrates an exemplary indentation for an embedded antenna of an exemplary UAV for a longer duration flight, according to some embodiments of the present disclosure.

FIG. 5C illustrates an exemplary indentation 126 for embedded antenna 125 of exemplary UAV 100, according to some embodiments of the present disclosure. Indentation 126 extends from a room 121 for FCS 120 and allows FCS 120 to transmit signals through antenna 125 installed nearby. This exemplary configuration may improve signal transmission efficiency by FCS 120.

Figure 6:
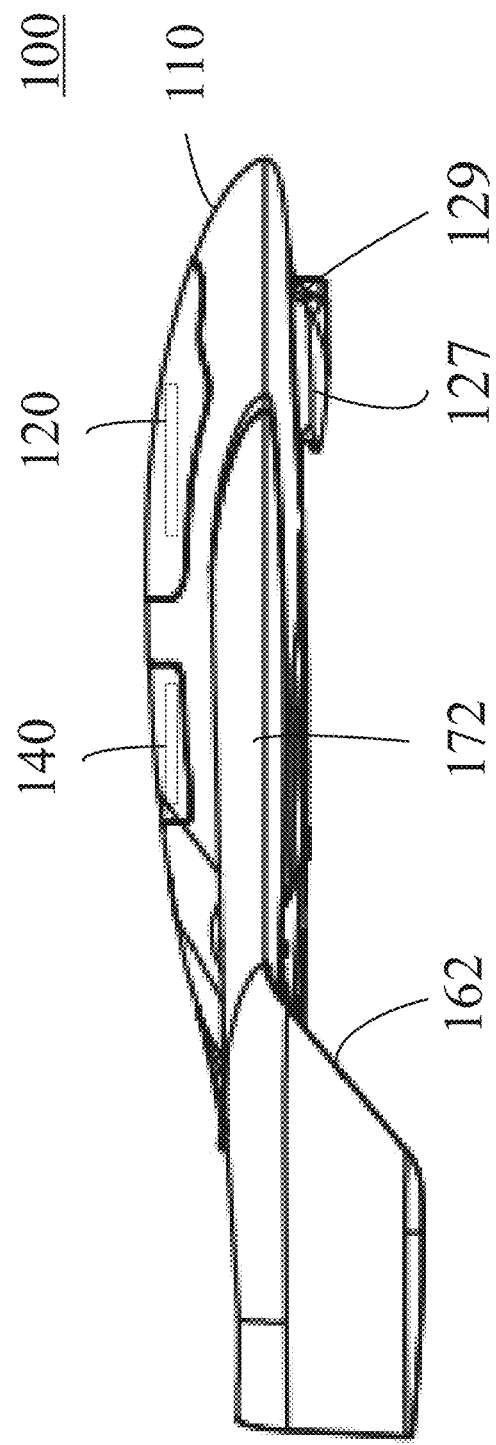
FIG. 6 illustrates a side view of an exemplary UAV for a longer duration flight, according to some embodiments of the present disclosure.
Figure 7:
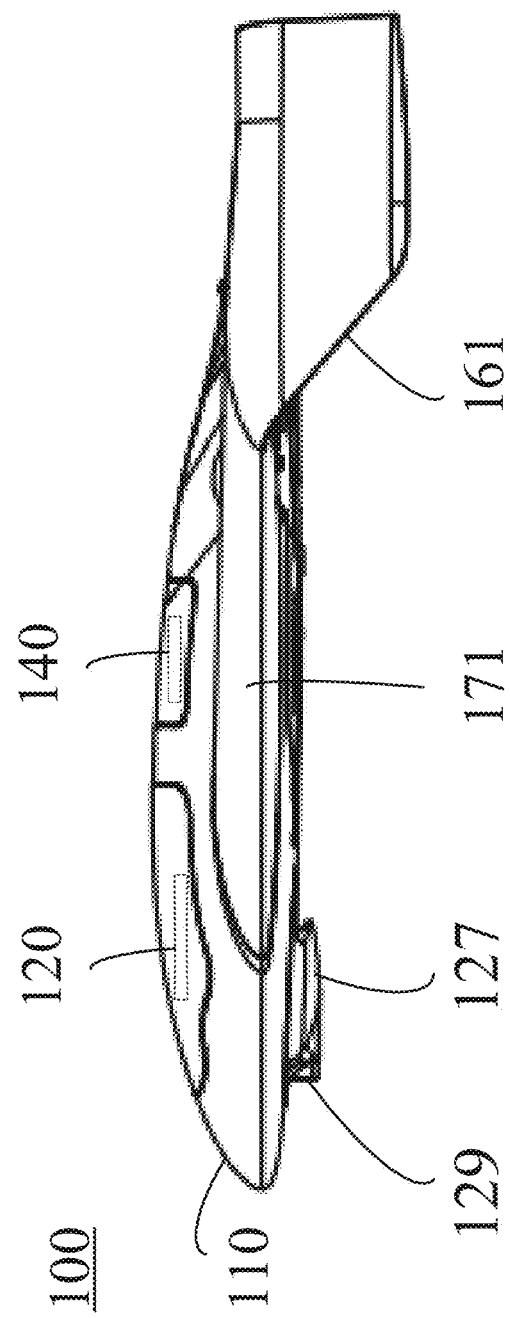
FIG. 7 illustrates a side view of an exemplary UAV for a longer duration flight, according to some embodiments of the present disclosure.

FIGS. 6 and 7 illustrate two side views of exemplary UAV 100, according to some embodiments of the present disclosure. As shown in FIGS. 6 and 7, streamlined UAV body assembly 110 may reduce certain wind resistance during flight. Upper surface of UAV body assembly 110 is smooth, and therefore allows air to flow through smoothly.

Figure 8:
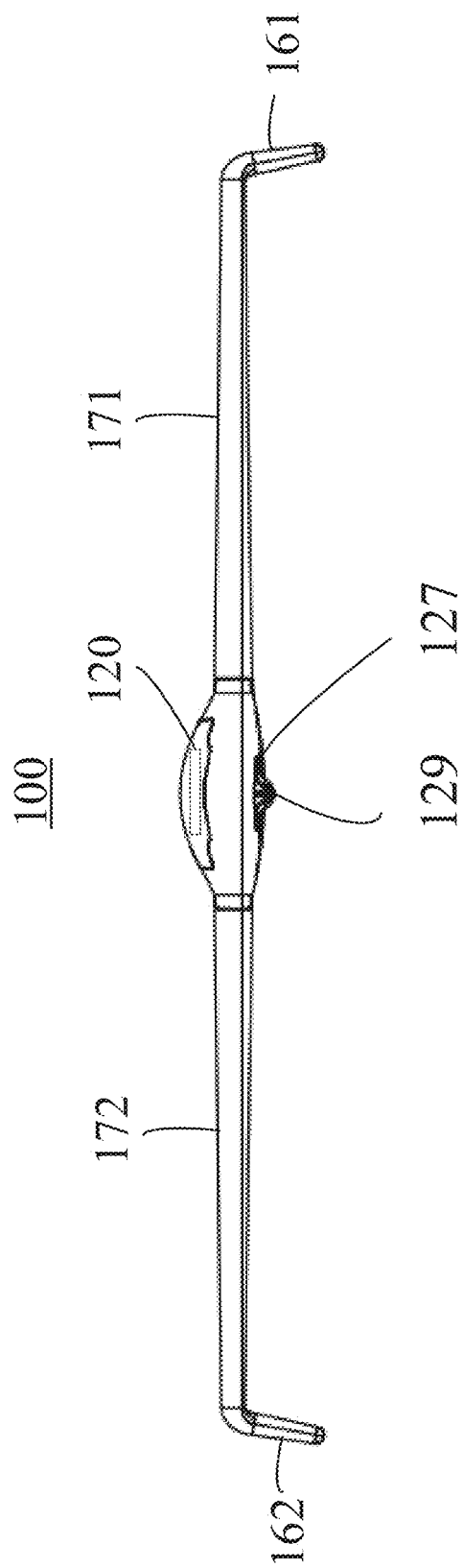
FIG. 8 illustrates a front view of an exemplary UAV for a longer duration flight, according to some embodiments of the present disclosure.

FIG. 8 illustrates a front view of exemplary UAV 100, according to some embodiments of the present disclosure. As shown in FIG. 8, a windward side of UAV 110 may have a small area, and those surfaces (i.e., UAV body assembly 110 and wings 171 and 172) may be streamlined, thereby reducing wind resistance. In addition, integrated pitot tube 129 and hook 127 may inhabit a relatively small area on the windward side of UAV 100. This configuration may reduce wind resistance of UAV 100.

Figure 9:
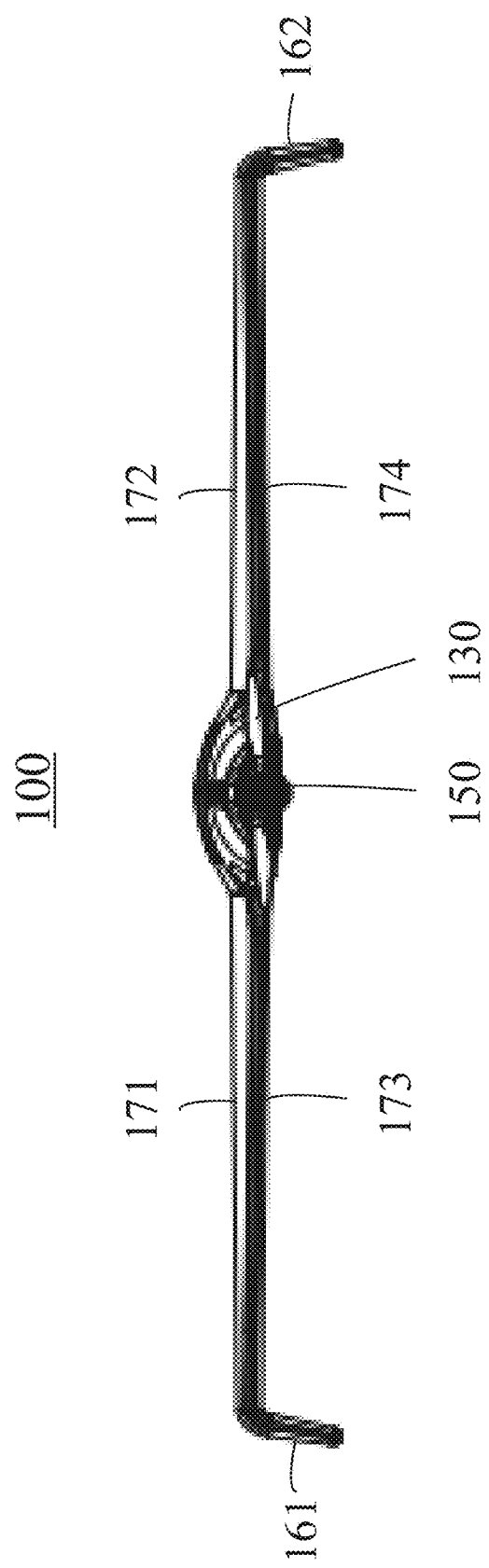
FIG. 9 illustrates a rear view of an exemplary UAV for a longer duration flight, according to some embodiments of the present disclosure.

FIG. 9 illustrates a rear view of exemplary UAV 100, according to some embodiments of the present disclosure. As shown in FIG. 9, integrated pitot tube 129 and hook 127 may be aligned with a central line of UAV body assembly 110 of UAV 100. This configuration may help balance UAV 100.

Figure 10:
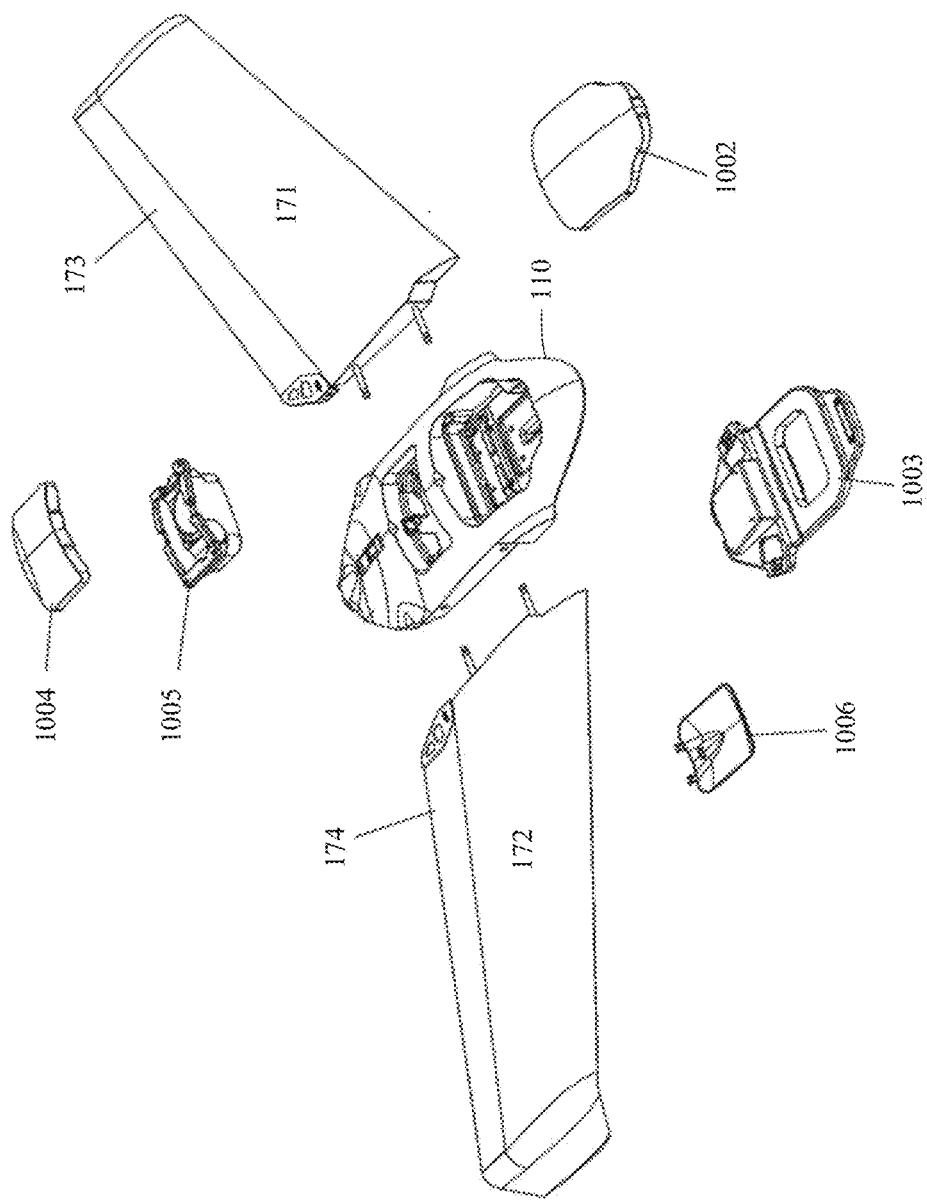
FIG. 10 illustrates a structural diagram of an exemplary UAV assembly for a longer duration flight, according to some embodiments of the present disclosure.

FIG. 10 illustrates a structural diagram of an exemplary UAV assembly, according to some embodiments of the present disclosure. UAV 100 includes left wing 171 and right wing 172, left aileron 173 and right aileron 174, a payload cover 1004, a payload frame 1005, a parachute cover 1006, a lower body assembly 1003, and a flight control system cover 1002.

Figure 11:
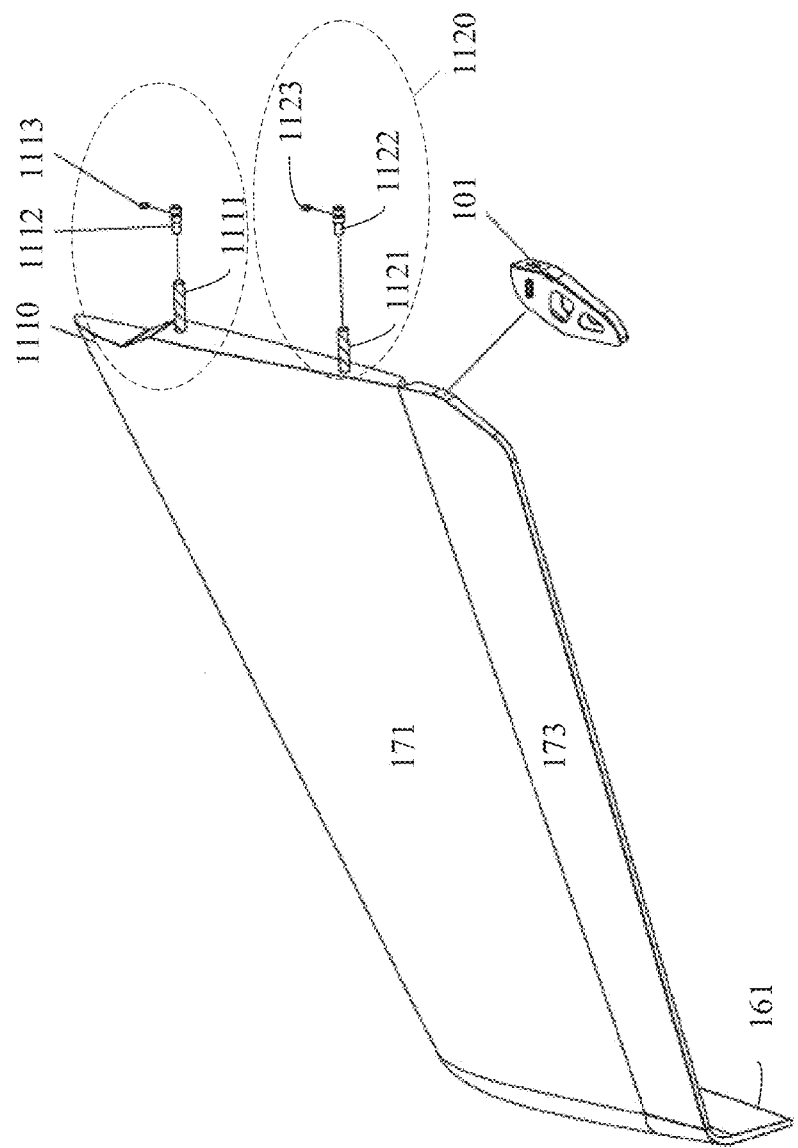
FIG. 11 is a schematic diagram of an exemplary removable left wing assembly, according to some embodiments of the present disclosure.

FIG. 11 is a schematic diagram of an exemplary removable left wing assembly, according to some embodiments of the present disclosure. The left wing assembly includes left wing 171, left aileron 173, left winglet 161, two removable kits 1110 and 1120, and left-wing controller 101. Removable kits 1110 includes a ping 1111, a removable ping 1112, and an O-ring 1113. Removable kits 1120 includes a ping 1121, a removable ping 1122, and an O-ring 1123. O-rings 1113 and 1123 may tighten up a combination of the left wing assembly and UAV body assembly 110 firmly.

Figure 12:
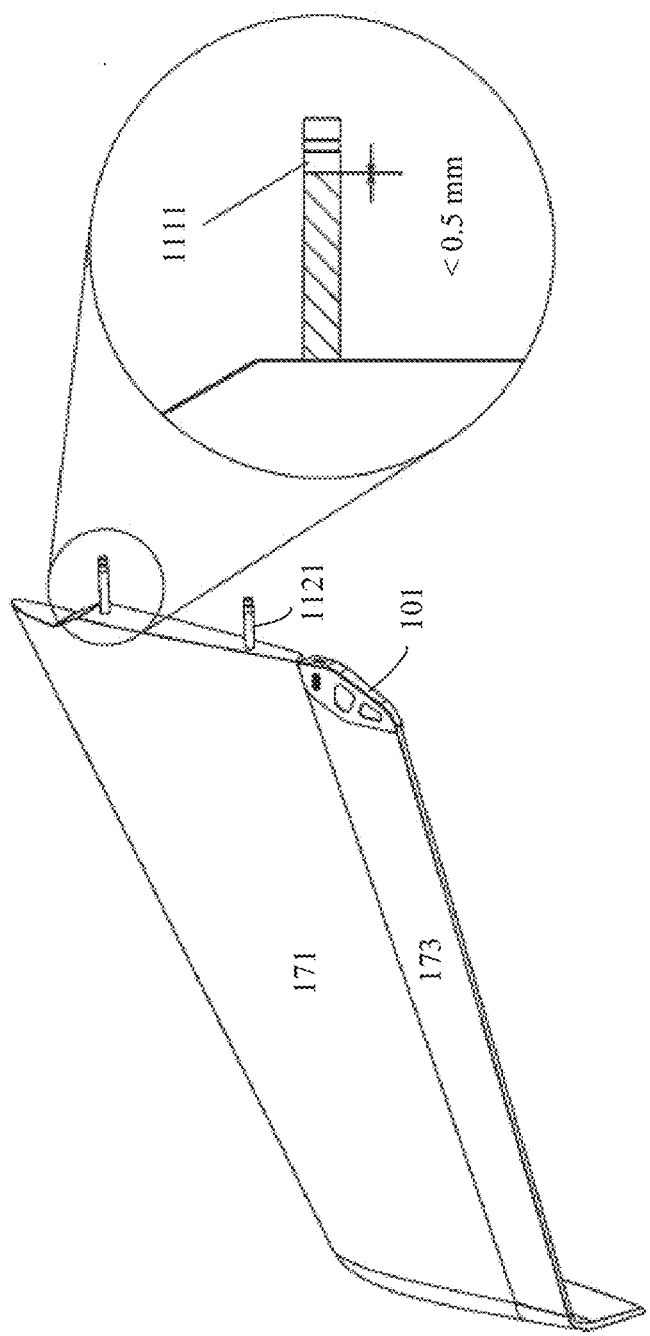
FIG. 12 is a schematic diagram of an exemplary removable left wing assembly, according to some embodiments of the present disclosure.

FIG. 12 is a schematic diagram of the exemplary removable left wing assembly, according to some embodiments of the present disclosure. As shown in FIG. 12, ping 1111 may be less than 0.5 mm.

Figure 13:
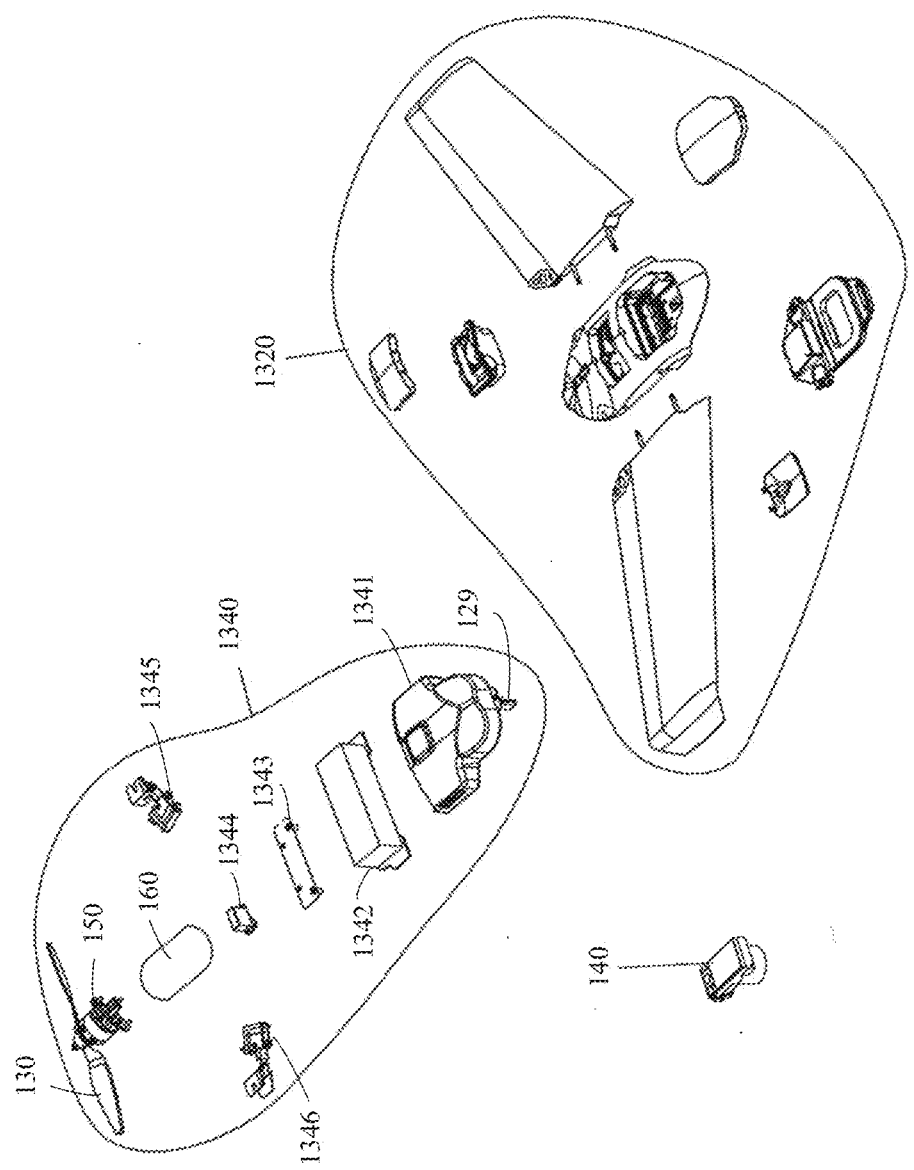
FIG. 13 is a schematic diagram of an exemplary UAV flight system assembly for a longer duration flight, according to some embodiments of the present disclosure.

FIG. 13 is a schematic diagram of an exemplary UAV flight system assembly, according to some embodiments of the present disclosure. This exemplary UAV flight system assembly includes a body assembly 1320, a system module 1340, and a payload camera 140. Components of body assembly 1320 can be referred to FIG. 11. System module 1340 includes pitot tube 129, a FCC 1341, a batter 1342, a parachute fixing plate 1343, a parachute open servo 1344, parachute 160, motor 150, propeller 130, a left aileron servo 1345, and a right aileron servo 1346. Payload 140 may comprise a camera, a multispectral camera, or a thermal infrared camera. Left aileron servo 1345 is operatively coupled to left aileron controller 101. Right aileron servo 1346 is operatively coupled to right aileron controller 102. FCC 1341 is configured to control left aileron servo 1345 and right aileron servo 1346 to control left aileron 173 and right aileron 174 when UAV 100 needs to turn its flight direction, climb, or descent.

FIG. 2 also illustrates an exemplary method for adjusting a CG of UAV 100 for longer duration flights, according to some embodiments of the present disclosure. The method may include adjusting a position of at least one of payload 140, a battery, or FCS 120 of the UAV to change the CG within a predetermined range of the MAC of UAV 100. For example, when UAV 100 requires adjusting its CG towards 21% of the MAC, one or more of FCS 120, the battery, and payload 140 may be fixed at the fix positions A1 and A2 in corresponding frames of these components. In contrast, when UAV 100 adjusts its CG towards 25% of the MAC, one or more of FCS 120, the battery, and payload 140 may be fixed at the fix positions C1 and C2 in the corresponding frames. Accordingly, adjusting the position of at least one of payload 140, the battery, or FCS 120 of the UAV to change the CG at a point between 21% and 25% of the MAC of UAV 100 may include changing fix positions of these components among fix points A1 and A2, B1 and B2, and C1 and C2.

In some embodiments, the method for adjusting the CG of UAV 100 for a longer flight duration may include adjusting the CG to a point between 21% and 25% of the MAC of UAV 100 by changing fix positions of those components among fix points A1 and A2, B1 and B2, and C1 and C2. Doing so may allow a flight duration more than forty minutes Alternatively, a method for adjusting the CG of UAV 100 may include adjusting the CG to a point between 23% and 25% of the MAC of UAV 100 by changing fix positions of those components among fix points A1 and A2, B1 and B2, and C1 and C2. Doing so may allow a flight duration more than sixty minutes. In some embodiments, a method for adjusting the CG of UAV 100 may include adjusting the CG to 23.5% or 24% of the MAC of UAV 100 by changing fix positions of those components among fix points A1 and A2, B1 and B2, and C1 and C2. Doing so may allow flight duration of seventy minutes or more.

It will be appreciated that the present disclosure is not limited to the exact construction that has been described above and illustrated in the accompanying drawings, and that various modifications and changes can be made without departing from the scope thereof. It is intended that the scope of the application should only be limited by the appended claims.

What is claimed is:

1. An unmanned aerial vehicle (UAV) for a long duration flight, the UAV comprising:
    a UAV body assembly;
    a flight control system (FCS) coupled to the UAV body assembly;
    a motor coupled to the UAV body assembly at one end and coupled to a propeller at the other end, wherein the FCS is communicatively connected to the motor;
    a pitot tube coupled the UAV body assembly; and
    a hook coupled to the UAV body assembly beneath the FCS, wherein the hook is for use of launching from a launch rack, and the pitot tube is integrated together with the hook to reduce a wind resistance of the UAV;
    wherein a center of gravity (CG) of the UAV is at a point between 21% and 25% of a mean aerodynamic chord (MAC) of the UAV.

2. The UAV of claim 1, wherein the CG is at a point between 23% and 25% of the MAC of the UAV.

3. The UAV of claim 1, wherein the CG is at 23.5% of the MAC of the UAV.

4. The UAV of claim 1, wherein the CG is at 24% of the MAC of the UAV.

5. The UAV of claim 1, further comprising:
    an adjustment assembly configured to adjust the CG at the point between 21% and 25% of the MAC of the UAV.

6. The UAV of claim 5, wherein the adjustment assembly is configured to adjust the CG at the point between 23% and 25% of the MAC of the UAV.

7. The UAV of claim 1, wherein the FCS includes:
    a flight control computer (FCC);
    an attitude and heading reference system communicatively connected to the FCC;
    a communication module communicatively connected to the FCC; and
    an antenna communicatively connected to the communication module, wherein the antenna is embedded in the UAV body assembly.

8. The UAV of claim 5,
    wherein the adjustment assembly is configured to adjust a position of at least one of a payload, a battery, or the FCS of the UAV to adjust the CG of the UAV.

9. The UAV of claim 8, wherein the FCC, the antenna, the pitot tube, and the hook are aligned with a central axis of the UAV body assembly.

10. The UAV of claim 1, wherein the integrated pitot tube and hook causes the wind resistance of the UAV substantially equal to a wind resistance of the pitot tube.

11. The UAV of claim 1, wherein the integrated pitot tube and hook causes the wind resistance of the UAV substantially equal to a wind resistance of the hook.

12. The UAV of claim 7, wherein the antenna is embedded in the hook.

13. The UAV of claim 12, wherein the antenna is a flat antenna.

14. The UAV of claim 1, wherein the hook is made of glass fiber.

15. The UAV of claim 7, wherein the antenna is a flat antenna.

* * * * *